(12) United States Patent
Chen

(10) Patent No.: US 8,885,927 B2
(45) Date of Patent: Nov. 11, 2014

(54) USER EMOTION DETECTION METHOD AND ASSOCIATED HANDWRITING INPUT ELECTRONIC DEVICE

(71) Applicant: Wistron Corporation, New Taipei (TW)

(72) Inventor: Chien-Hang Chen, New Taipei (TW)

(73) Assignee: Wistron Corporation, New Taipei City (TW)

( * ) Notice: Subject to any disclaimer, the term of this patent is extended or adjusted under 35 U.S.C. 154(b) by 150 days.

(21) Appl. No.: 13/716,237

(22) Filed: Dec. 17, 2012

(65) Prior Publication Data

US 2013/0216126 A1    Aug. 22, 2013

(30) Foreign Application Priority Data

Feb. 21, 2012   (TW) .............................. 101105701 A

(51) Int. Cl.
*G06K 9/62* (2006.01)
*G06K 9/00* (2006.01)
*G06F 3/0488* (2013.01)
*G06F 3/01* (2006.01)

(52) U.S. Cl.
CPC .............. *G06K 9/62* (2013.01); *G06K 9/00436* (2013.01); *G06K 9/6263* (2013.01); *G06F 2203/011* (2013.01); *G06F 3/04883* (2013.01); *G06F 3/017* (2013.01); *G06F 3/011* (2013.01)

USPC ......................................................... 382/156

(58) Field of Classification Search
None
See application file for complete search history.

(56) References Cited

FOREIGN PATENT DOCUMENTS

CN           101370195 A       2/2009

OTHER PUBLICATIONS

TW Office Action dated May 27, 2014.
Partial translation of TW Office Action dated May 27, 2014.
English Translation of CN101370195A (Published Feb. 18, 2009).

*Primary Examiner* — Stephen R Koziol
*Assistant Examiner* — Amandeep Saini
(74) *Attorney, Agent, or Firm* — McClure, Qualey & Rodack, LLP

(57) ABSTRACT

A user emotion detection method for a handwriting input electronic device is provided. The method includes steps of: obtaining at least one handwriting input characteristic parameter; determining a user emotion parameter by an artificial neural network of the handwriting input electronic device according to the handwriting input characteristic value and at least one associated linkage value; displaying the user emotion parameter on a touch display panel of the handwriting input electronic device; receiving a user feedback parameter; determining whether to adjust the at least one associated linkage value and if yes, adjusting the at least one associated linkage value according to the user feedback parameter to construct and adjust the artificial neural network.

18 Claims, 4 Drawing Sheets

USER EMOTION DETECTION METHOD AND ASSOCIATED HANDWRITING INPUT ELECTRONIC DEVICE

This application claims the benefit of Taiwan application Serial No. 101105701, filed Feb. 21, 2012, the subject matter of which is incorporated herein by reference.

TECHNICAL FIELD

The disclosure relates to a user motion detection method and an associated handwriting input electronic device.

BACKGROUND

A new technology frenzy is spread globally as tablet computers (e.g., i-Pad by Apple) have been launched. With more and more manufacturers devoting in developments of tablet computers, it can be expected that the role of tablet computers in the daily life shall become increasingly prominent.

One distinctive feature of a tablet computer is that a conventional keyboard/house is replaced by a touch input device for input. Such feature clearly distinguishes tablet computers from current desktop computers and laptop computers, making tablet computers much more friendly use than conventional computers. Numerous novel applications are also utilized in tablet computers, e.g., electronic schoolbags and medical record applications. One main reason contributing to the rapid popularity of tablet computers is the huge progress in touch control devices, e.g., the enhancement in sensitivity.

Input means of a touch control device includes a virtual keyboard and handwriting input. In recognizing user handwriting, the touch control device receives factors including a finger pressure parameter, a finger speed parameter, recognition accuracy, and user re-input recognition. These factors signifying user mental information are sent to the electronic device, and may be indications of user emotions. For example, a handwriting speed may be faster when a user is in an irritated mental state.

Therefore, a user emotion detecting/learning system and associated handwriting input electronic device based on handwriting input/recognition is provided, which update emotion detections according to user feedbacks.

SUMMARY OF THE DISCLOSURE

The disclosure is directed to a user emotion detection method and associated handwriting input electronic device, which detects a user emotion according to handwriting characteristic parameters and is capable of gradually self-learning according to feedback from the user.

According to an exemplary embodiment the present disclosure, a user emotion detection method for a handwriting input electronic device is provided. The user emotion detection method includes steps of: obtaining at least one handwriting input characteristic parameter; determining a user emotion parameter by an artificial neural network of the handwriting input electronic device according to the handwriting input characteristic value and at least one associated linkage value; displaying the user emotion parameter on a touch display panel of the handwriting input electronic device; receiving a user feedback parameter; and determining whether to adjust the at least one associated linkage value and if yes, adjusting the at least one associated linkage value according to the user feedback parameter to construct and adjust the artificial neural network.

According to another exemplary embodiment the present disclosure, a handwriting input electronic device is provided. The handwriting input electronic device includes: a touch display panel, for receiving a user handwriting input; a touch control circuit, coupled to the touch display panel, for obtaining a handwriting speed parameter and/or a handwriting pressure parameter according to the user handwriting input; a memory, storing handwriting input recognition software, which obtains a handwriting modification number parameter according to the user handwriting input; and a processing unit, coupled to the touch display panel, the touch control circuit and the memory. The processing unit determines a user emotion parameter according to at least one associated linkage value, the handwriting speed parameter, the handwriting pressure parameter, and/or the handwriting modification number parameter, and controls the touch display panel to display the user emotion parameter. The touch display panel receives a user feedback parameter. According to the user feedback parameter, the touch display panel determines whether to adjust the at least one associated linkage value and adjusts the at least one associated linkage value if yes.

The above and other contents of the disclosure will become better understood with regard to the following detailed description of the preferred but non-limiting embodiments. The following description is made with reference to the accompanying drawings.

Figure 1:
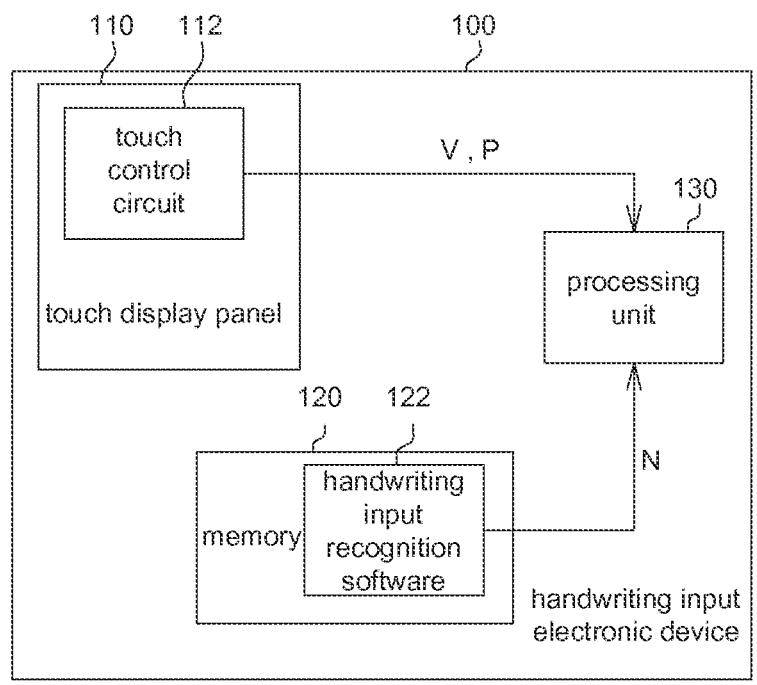
FIG. 1 is a block diagram of a handwriting input electronic device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

A learning system for user emotion detection based on handwriting input characteristics is provided according to an embodiment of the present disclosure. When an electronic device is utilized by a user, the electronic device detects and displays user emotion for the user, and to further remind the user. The electronic device gradually increases emotion recognition accuracy through self-learning according to user feedback.

Figure 2:
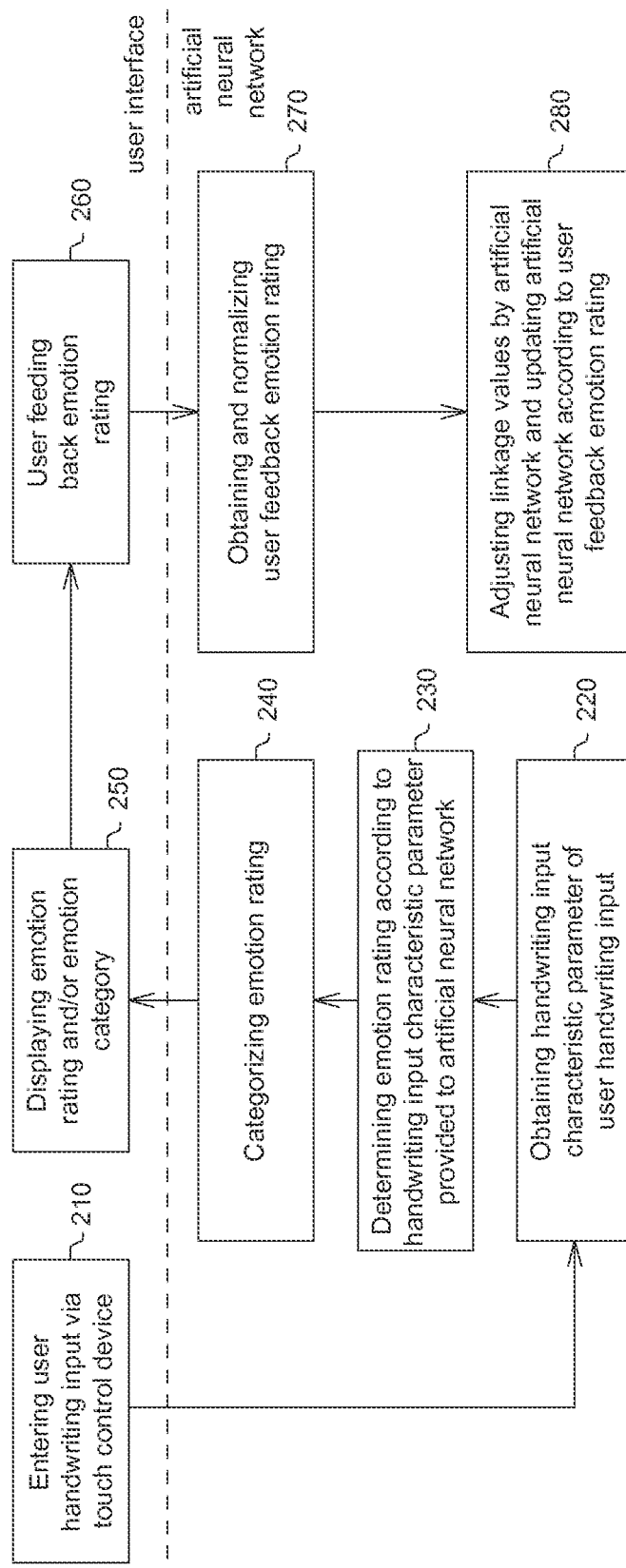
FIG. 2 is a flowchart of a user motion detection of a handwriting input electronic device according to an embodiment of the present disclosure.

FIGS. 1 and 2 respectively show a block diagram of a handwriting input electronic device and a flowchart of a user emotion detection according to an embodiment of the present disclosure.

Referring to FIG. 1, a handwriting input electronic device 100 according to an embodiment of the present disclosure includes: a touch display panel 110, for receiving a user handwriting input and displaying an image; a touch control circuit 112, coupled to the touch display panel 110, for obtaining user handwriting input characteristic parameters (e.g., a user handwriting speed parameter and/or a user handwriting pressure parameter) based on user handwriting input; a memory 120, storing handwriting input recognition software 122, which obtains a handwriting modification number parameter according to the user handwriting input; and a processing unit 130, coupled to the touch display panel 110, the touch control circuit 112 and the memory 120.

According to at least one associated linkage value, the handwriting speed parameter, the handwriting pressure parameter, and/or the handwriting modification number parameter, the processing unit 130 determines an emotion parameter (e.g., an emotion rating) of the user and controls the touch display panel 110 to display the user emotion parameter/rating.

As the user sees the emotion parameter/rating displayed on the touch display panel 110, the user provides feedback according to a prompt (an optional prompt). For example, the user enters his/her own current emotion parameter/rating on the touch display panel 110. According to the parameter fed back by the user, the processing unit 130 determines whether to adjust the associated linkage value and how to adjust the associated linkage value, with details thereof to be described shortly.

It should be noted that, the touch control circuit 112 is implemented in the touch display panel 110 as an example rather than a limitation of the present disclosure.

Referring to FIG. 2, in Step 210, the user enters a handwriting input via a touch control device (e.g., the touch display panel 110 in FIG. 1).

In Step 220, values of a handwriting pressure, a handwriting speed and/or a handwriting modification number, considered as handwriting input characteristic parameters, are obtained. For example, in Step 220, the handwriting pressure parameter and/or handwriting speed parameter is obtained by the touch control circuit 112 in FIG. 1, and the modification number parameter is obtained by the handwriting input recognition software 122 in FIG. 1. The touch control circuit 112 in FIG. 1 outputs a handwriting speed parameter V and a handwriting pressure parameter P to the processing unit 130. The handwriting input recognition software 122 in FIG. 1 outputs a modification number parameter N to the processing unit 130.

For example, the handwriting pressure parameter includes at least one or any combination of: a handwriting start point pressure parameter (representing a pressure imposed on the touch control device when the user writes a first stroke), a handwriting end point pressure parameter (representing a pressure imposed on the touch control device when the user writes a last stroke), and a handwriting average pressure parameter (representing an average pressure during a handwriting process of the user).

For example, the handwriting speed parameter includes at least one or any combination of: a handwriting stroke speed parameter (representing a speed for any stroke of the user), a handwriting start stroke speed parameter (representing a handwriting speed of a first stroke of the user), a handwriting end stroke speed parameter (representing a handwriting speed of a last stroke of the user), and a handwriting average speed parameter (representing an average speed of a current handwriting process of the user).

Generally speaking, the handwriting pressure parameter and/or speed parameter (e.g., the handwriting start point pressure parameter and/or handwriting start stroke speed parameter) may be higher when the user is in an emotional state of agitation, excitement or ecstasy. In contrast, when the user is an emotional state of depression or frustration, the handwriting pressure parameter and/or speed parameter (e.g., the handwriting start point pressure parameter and/or handwriting start stroke speed parameter) may be lower.

Further, the modification number parameter represents the number of times of modifications made in a current user handwriting process. Similarly, when the user is in an emotional state of agitation, excitement or ecstasy, the number of modifications may be higher (e.g., prone to making mistakes due to an unstable emotion). In contrast, when the user is in a calm emotional state, the number of modifications may be smaller (e.g., less likely to make mistakes due to a stable emotion).

Thus, in this embodiment, the learning system is gradually adjusted through the handwriting pressure, speed and/or modification number parameter to more correctly reflect/detect the user emotion.

In Step 230, the handwriting input characteristic parameter obtained in Step 220 is provided to an artificial neural network to determine an emotion rating. For example, Step 230 is performed by the processing unit 130 in FIG. 1. Details for determining the emotion rating are described below.

In Step 240, the emotion rating is categorized. For example, an emotion rating greater than 0.7 is categorized as a "bad mood", an emotion rating between 0.3 and 0.7 is categorized as a "normal mood", and an emotion rating between 0 and 0.3 is categorized as a "good mood". Other rating schemes may be utilized in other embodiments.

In Step 250, the emotion rating and/or emotion category is displayed on the touch display panel.

In Step 260, upon seeing the emotion rating and/or emotion category, the user may manually feed back the emotion rating for system learning.

In Step 270, the system obtains the emotion rating fed back by the user. Further, the system may normalize the emotion rating fed back by the user.

In Step 280, the artificial neural network adjusts respectively linkage values to update the artificial neural network according to the (normalized) emotion rating fed back by the user.

Details for calculating the emotion rating and training the artificial neural network are described below.

The learning system of the embodiment is implemented through the artificial neural network. The artificial neural network is capable of inference via a fast calculation speed of a CPU and through learning. That is to say, the artificial neural network is preprogrammed to derive a pre-defined result according to a corresponding situation. As the number of examples (situations and results) gets larger, the accuracy of the artificial neural network gets higher or may even provide possible results without pre-learning. In this embodiment, an example of a supervised learning application in the artificial neural network is given below.

Figure 3:
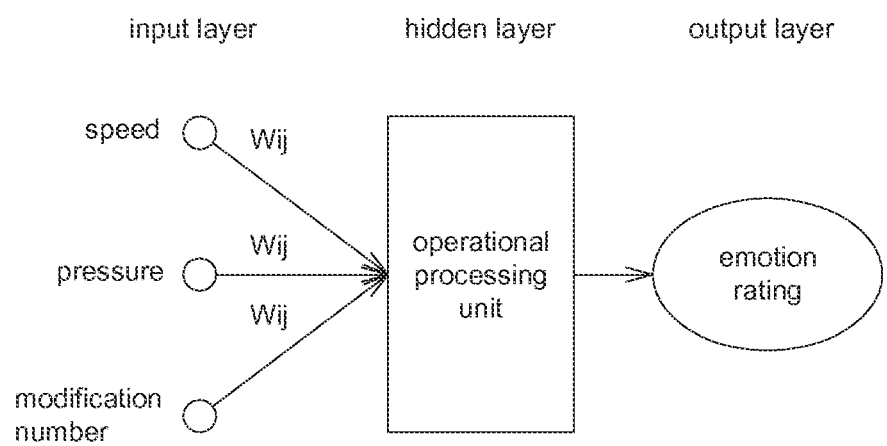
FIG. 3 is an example of a supervised learning application in an artificial neural network.

FIG. 3 shows an example of a supervised learning application in an artificial neural network. As shown in FIG. 3, the artificial neural network includes an input layer, a hidden layer and an output layer. Although only one hidden layer is depicted in FIG. 3, the artificial neural network may in fact include multiple hidden layers (which inevitably affect the computing speed and resource consumption).

As shown in FIG. 3, the input layer of the artificial neural network receives the foregoing user handwriting speed parameter, user handwriting pressure parameter and user handwriting modification number parameter according to associated details described above.

The hidden layer includes a computing processing unit (e.g., the processing unit 130 in FIG. 1). The hidden layer implements functions.

To better explain the embodiment, assume that a speed initial linkage value is 0.4, a pressure initial linkage value is 0.5, a modification number initial linkage value is 0.1 However, the above numbers are merely examples of the present disclosure. In FIG. 3, the linkage value is denoted by Wij.

After obtaining the three parameters, values corresponding to the three input parameters and respective linkage values Wij are calculated, and are added up by the hidden layer to provide an output result (may be regarded as a current emotion rating of the user) to the output layer. If an emotion rating is provided by the user (e.g., the user enters a self-assessed emotion rating through the touch control device), a difference between the determined current emotion rating and the emotion rating fed back by the user is calculated. That is, the emotion rating fed back by the user is regarded as a reference value. According to the difference, the linkage values are adjusted and/or trained. After multiple training processes, the determination accuracy of the artificial neural network gets more and more precise to even reach a stable value.

For example, a learning algorithm of the hidden layer of the artificial neural network is represented by the following equations:

$$\delta_j^n = (T_j - A_j^n) \cdot f'(net_j^n) \quad (1)$$

$$\Delta W_{ij} = \eta \cdot \delta_j^n \cdot A_i^{n-1} \quad (2)$$

In the equations (1) and (2), $T_j$ is a target output value of a $j^{th}$ unit, and j is a positive integer, e.g., 3 units (j=3) are present in FIG. 3; $A_j^n$ is an output value of the $j^{th}$ unit at an $n^{th}$ layer, and n is a positive integer, e.g., 3 layers (n=3) are present in FIG. 3; $\delta_j^n$ is a difference (or an error value) between a target output value and an actual output value of the $j^{th}$ unit at $n^{th}$ layer; $\eta$ is a learning rate; $\Delta W_{ij}$ is a correction value for the linkage value; $net_j^n$ is an integration function for integrating information from other processing units; f'(.) is a conversion function for converting an output value of a function to an output value of the processing unit.

In this embodiment, for example, the integration function may be a weighted product sum, and the conversion function is a non-limiting function.

An exemplary process for training the artificial neural network of the embodiment is described below. As the user enters a handwriting input on the touch control device, a system (e.g., the touch control circuit 112 and the handwriting input recognition software 122) obtains handwriting input characteristic values such as the speed parameter, the pressure parameter and the modification number parameter. In different systems, maximum values and minimum values of these parameters may be defined, and these parameters may be normalized (to be between 0 and 1). For illustrative purposes, assume that the speed parameter, the pressure parameter and the modification number parameter of a user handwriting input are respectively 0.7, 0.7 and 0.5.

According to three initial linkage values and three (normalized) parameters, an emotion rating is calculated. For example, the three parameters are respectively multiplied by the corresponding initial linkage values, and the products are added up to a sum. Taking the foregoing three parameters for example, the emotion rating is 0.7*0.4+0.7*0.5+0.5*0.1=0.64.

The emotion rating is then categorized, and the result of emotion category and/or the emotion rating is displayed on the display panel and presented to the user.

After the user sees the emotion category and/or the emotion rating, the system prompts the user to reply to user's emotion category and/or emotion rating. The emotion category and/or the emotion rating provided by the user is normalized to be between 0 and 1 (e.g., 0.9).

Hence, the difference between the target output value and the actual output value is 0.9−0.64=0.26. According to the difference, a correction value for the linkage values is respectively (e.g., correction value=handwriting characteristic value*linkage value*difference):

correction value for speed linkage value: 0.4*0.26*0.7=0.0728;
correction value for pressure linkage value: 0.5*0.26*0.7=0.091; and
correction value for modification number linkage value: 0.1*0.26*0.5=0.013.

The corrected linkage values are (e.g., the initial linkage value plus the correction value of the linkage value):
corrected speed linkage value: 0.4+0.0728=0.4728;
corrected pressure linkage value: 0.5+0.091=0.591; and
corrected modification number linkage value: 0.1+0.013=0.113.

The above corrected values are normalized as:
(normalized) speed linkage value: 0.401;
(normalized) pressure linkage value: 0.502; and
(normalized) modification number linkage value: 0.097.

Accordingly, after multiple training processes (i.e., after multiple user responses and multiple linkage-value corrections by the system), the linkage values gradually converge to a stable state.

Therefore, in this embodiment, the value fed back by the user may be considered as a target (reference) output value for emotion detection and learning, instead of learning only after having re-trained the artificial neural network.

Figure 4:
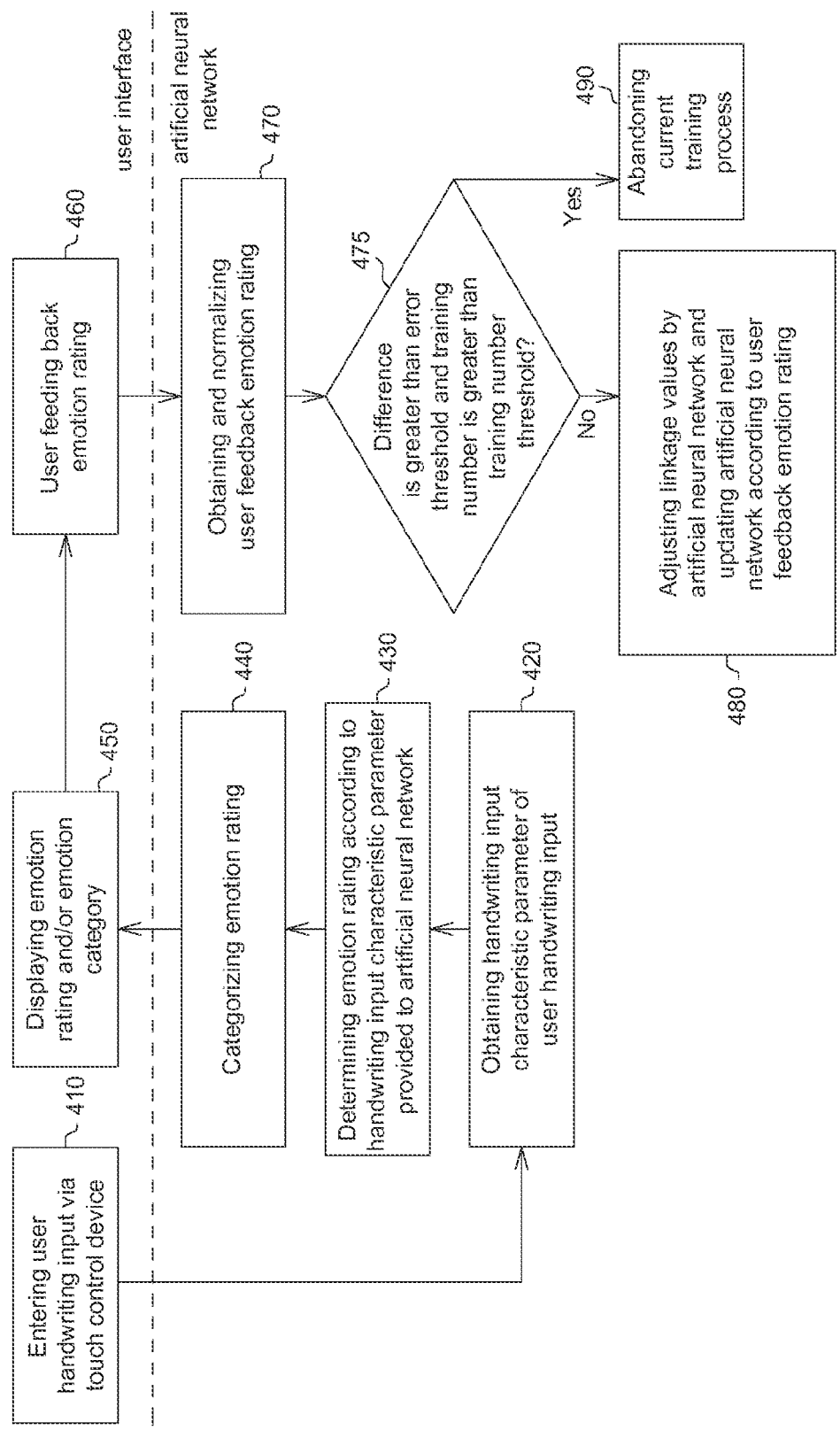
FIG. 4 is a flowchart of a user motion detection according to another embodiment of the present disclosure.

FIG. 4 shows a flowchart of a user emotion detection process according to another embodiment of the present disclosure. Steps 410 to 470 and Step 480 may in principle be identical or similar to Steps 210 to 270 and Step 280 in FIG. 2, and details thereof shall be omitted herein.

In Step 475, it is determined whether a difference (between the user feedback emotion rating and the determined emotion rating) is greater than a threshold, and whether the number of trainings of the artificial neural network is greater than a training number threshold. When a determination result of Step 475 is affirmative, the current training is abandoned in Step 490. That is to say, because the difference (i.e., the error) is greater than the error threshold, the determination result of this training process is regarded as incorrect information and discarded. When the determination result of Step 475 is negative, Step 480 is performed.

The above embodiment of the present disclosure may be implemented to many kinds of handwriting input electronic devices to allow user to know his/her own emotion and to appropriately remind the user. Therefore, the embodiment may be applied to various personalized devices such as mobile phones and tablet computers. Further, the embodiment may be utilized for providing emotional records. For example, by implementing the embodiment to an electronic schoolbag, parents/teachers may be well informed of emotional changes of children/students. Along with the improved efficiency of learning algorithms, applications of the embodiment may become more versatile and humane while also offering enhanced learning efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A user emotion detection method, for a handwriting input electronic device, the method comprising:

obtaining at least one handwriting input characteristic parameter according to a user handwriting input wherein the handwriting input characteristic parameter at least comprises one or any combination of: a handwriting speed parameter, a handwriting pressure parameter and a handwriting modification number parameter;

determining a user emotion parameter by an artificial neural network of the handwriting input electronic device according to the handwriting input characteristic value and at least one associated linkage value;

displaying the user emotion parameter on a touch display panel of the handwriting input electronic device;

receiving a user feedback parameter; and determining whether to adjust the at least one associated linkage value and if yes, adjusting the at least one associated linkage value according to the user feedback parameter to construct and adjust the artificial neural network.

2. The user emotion detection method according to claim 1, wherein the handwriting speed parameter at least comprises one or any combination of: a handwriting stroke speed parameter, a handwriting start stroke speed parameter, a handwriting end stroke speed parameter and a handwriting average speed parameter.

3. The user emotion detection method according to claim 1, wherein the handwriting pressure parameter comprises one or any combination of: a handwriting start point pressure parameter, a handwriting end point pressure parameter and a handwriting average pressure parameter.

4. The user emotion detection method according to claim 1, wherein the user emotion parameter comprises at least one or any combination of: a user emotion rating parameter and a user emotion category parameter.

5. The user emotion detection method according to claim 4, wherein the user emotion category parameter is obtained according to the user emotion rating parameter.

6. The user emotion detection method according to claim 1, wherein the step of receiving the user feedback parameter comprises:

receiving and normalizing the user feedback parameter.

7. The user emotion detection method according to claim 1, wherein the step of determining whether to adjust the at least associated linkage value according to the user feedback parameter comprises:

keeping the at least one associated linkage value if a difference between the user feedback parameter and the user emotion parameter is greater than an error threshold and if a training number of the artificial neural network is greater than a training number threshold; and if not, adjusting the at least one associated linkage value.

8. The user emotion detection method according to claim 1, wherein the step of adjusting the at least one associated linkage value comprises:

adjusting the at least one associated linkage value according to a difference between the user feedback parameter and the user emotion parameter.

9. The user emotion detection method according to claim 8, wherein the step of adjusting the at least one associated linkage value comprises:

obtaining a correction value for the at least one associated linkage value according to the difference, the handwriting input characteristic parameter and the at least one linkage value; and adjusting the at least associated linkage value according to the correction value.

10. A handwriting input electronic device, comprising:

a touch display panel, for receiving a user handwriting input;

a touch control circuit, coupled to the touch display panel, for obtaining a handwriting speed parameter and/or a handwriting pressure parameter according to the user handwriting input;

a memory, storing handwriting input recognition software, which obtains a handwriting modification number parameter according to the user handwriting input; and a processing unit, coupled to the touch display panel, the touch control circuit and the memory;

wherein, the processing unit determines a user emotion parameter according to at least one associated linkage value, the handwriting speed parameter, the handwriting pressure parameter and/or the handwriting modification number parameter, and controls the touch display panel to display the user emotion parameter; the touch display panel receives a user feedback parameter; and the processing unit further determines whether to adjust the at least associated linkage value and adjusts the at least one associated linkage value according to the user feedback parameter.

11. The handwriting input electronic device according to claim 10, wherein the handwriting speed parameter at least comprises one or any combination of: a handwriting stroke speed parameter, a handwriting start stroke speed parameter, a handwriting end stroke speed parameter and a handwriting average speed parameter.

12. The handwriting input electronic device according to claim 10, wherein the handwriting pressure parameter comprises one or any combination of: a handwriting start point pressure parameter, a handwriting end point pressure parameter and a handwriting average pressure parameter.

13. The handwriting input electronic device according to claim 10, wherein the user emotion parameter comprises at least one or any combination of: a user emotion rating parameter and a user emotion category parameter.

14. The handwriting input electronic device according to claim 13, wherein the processing unit obtains the user emotion category parameter according to the user emotion rating parameter.

15. The handwriting input electronic device according to claim 10, wherein the processing unit normalizes the received user feedback parameter.

16. The handwriting input electronic device according to claim 10, wherein:

the processing unit determines to keep the at least one associated linkage value if a difference between the user feedback parameter and the user emotion parameter is greater than an error threshold and a training number of the artificial neural network is greater than a training number threshold; and the processing unit adjusts the at least one associated linkage value if not.

17. The handwriting input electronic device according to claim 10, wherein the processing unit adjusts the at least one associated linkage value according to a difference between the user feedback parameter and the user emotion parameter.

18. The handwriting input electronic device according to claim 17, wherein the processing unit obtains a correction value for the at least one associated linkage value according to the difference, the handwriting input characteristic parameter and the at least one linkage value, and adjusts the at least one associated linkage value according to the correction value.

* * * * *